United States Patent [19]

Gloor et al.

[11] Patent Number: 4,693,870
[45] Date of Patent: Sep. 15, 1987

[54] TUBULAR OZONIZER WITH COOLED INNER ELECTRODE

[75] Inventors: Urs Gloor, Baden; Michael Hirth, Unterentfelden; Ulrich Kogelschatz, Hausen, all of Switzerland

[73] Assignee: BBC Brown, Boveri & Company Limited, Baden, Switzerland

[21] Appl. No.: 746,122

[22] Filed: Jun. 18, 1985

[30] Foreign Application Priority Data

Jun. 27, 1984 [CH] Switzerland ............... 3106/84

[51] Int. Cl.⁴ .................................. B01J 19/08
[52] U.S. Cl. .................... 422/186.19; 422/186.07; 422/186.2
[58] Field of Search ........... 422/186.2, 186.19, 186.18, 422/186.11, 186.07, 186.08; 204/176

[56] References Cited

U.S. PATENT DOCUMENTS

| | | | |
|---|---|---|---|
| 1,579,162 | 3/1973 | Stenhe et al. | 422/186.19 X |
| 1,834,705 | 12/1931 | Hartman | 422/186.19 |
| 1,965,766 | 7/1934 | Hartman | 422/186.19 |
| 3,661,763 | 5/1972 | Cremer et al. | 422/186.19 |
| 3,663,418 | 5/1972 | Kawahata | 422/186.11 |
| 3,730,874 | 5/1973 | Trub | 422/186.19 |
| 3,899,685 | 8/1975 | Frances et al. | 422/186.19 X |
| 4,013,567 | 3/1977 | Emelyanov et al. | 422/186.19 |
| 4,025,441 | 5/1977 | Tobata et a. | 422/186.19 |

FOREIGN PATENT DOCUMENTS

| | | |
|---|---|---|
| 3247373 | 6/1984 | Fed. Rep. of Germany ............... 422/186.07 |
| 0011894 | 1/1979 | Japan ........................... 204/176 |
| 0133493 | 10/1979 | Japan ........................... 422/186.19 |

Primary Examiner—Edward A. Miller
Assistant Examiner—Susan Wolffe
Attorney, Agent, or Firm—Oblon, Fisher, Spivak, McClelland, & Maier

[57] ABSTRACT

In an internally cooled tubular ozonizer, there is built into the interior of the glass tube (5) a cooling tube (9) whose outer diameter is only slightly smaller than the inner diameter of the glass tube (5). The annular gap left is filled up with a temperature-resistant casting compound (10) which conducts heat well. In the case of a synthetic resin casting compound (10), the cooling tube (9) is connected galvanically via contact springs (11) to the metal layer (8), serving as the inner electrode, on the inner wall of the glass tube (5). The heat transfer from the cooling agent in the cooling tube (8) to the glass tube (5) is not impeded by the casting compound (10). Temperature stresses between the glass tube (5) and the cooling tube (9) are largely reduced, as a result of which the operational safety of the ozonizer is increased, especially at fairly high power densities.

21 Claims, 7 Drawing Figures

TUBULAR OZONIZER WITH COOLED INNER ELECTRODE

FIELD OF THE INVENTION

The invention relates to a tubular ozoniser having a metallic tubular outer electrode and a tube of a dielectric material coaxially disposed in the tubular outer electrode and separted therefrom by an annular discharge gap. The inner wall of the tubular outer electrode is provided with a metal layer forming the inner electrode of the tubular ozoniser.

BACKGROUND OF THE INVENTION

Conventional tubular ozonisers have an outer electrode preferably consisting of high-grade steel and an inner electrode in the form of a conducting coating deposited on the inner wall of a glass tube. The annular space between the inner wall of the high-grade steel tube and the outer wall of the glass tube forms the discharge gap.

The (necessary) cooling of the outer electrode presents no difficulties of any kind. The situation is different with respect to the cooling of the inner electrode, which is indispensable for increasing the power density. The direct impacting of the inner electrode or of the glass tube with a cooling liquid as is, for example, proposed in German Offenlegungsschrift No. 2,537,124 involves the risk that, in the event of a fracture of the dielectric tube, cooling liquid gets into the discharge chamber and causes consequential damage there. It is therefore necessary to design the inner cooling circuit using pressure-resistant and tough materials. For this purpose, the high-grade steel material, for example, which has proved its value in the outer cooling circuit, is an obvious choice.

Hitherto it has been assumed that a dielectric had to be mounted directly as a close fit on such a high-grade steel tube, since under no circumstances must an air gap be left between the dielectric and the inner electrode (steel tube). An electric discharge would otherwise form in the air gap, which would mean energy loss and that the heat transfer would be poor (with an air gap of 0.5 mm, the internal cooling would already be pointless because of the poor heat conduction).

OBJECT OF THE INVENTION

The principal object of the invention is to create an internal cooling is an ozoniser which does not impair the operational safety of the ozoniser, but which nevertheless makes possible an efficient cooling of the dielectric of the ozoniser.

SUMMARY OF THE INVENTION

The essential advantage of the invention is to be seen in the fact that, in the event of fracture of the comparatively sensitive dielectric, no cooling liquid can penetrate into the discharge chamber. In this way, the protective measures which are otherwise absolutely necessary for this fault condition are no longer needed. The cooling action, on the other hand, is only insignificantly impaired by the expansion gap. At the same time, the expansion gap is dimensioned so that, if the heat sink heats up to maximum operating temperature and above, no forces are transmitted to the dielectric tube.

In principle, two categories of heat sink can be used:
Into the dielectric tube there is inserted a heat sink whose external diameter is only slightly smaller than the internal diameter of the dielectric tube. The annular gap left (typically 0.5–1.5 mm wide), is filled up with a casting compound which conducts heat well. The casting compound is preferably a synthetic resin compound such, as is used for the sealing of electrical components.

The dielectric tube is filled by casting with a low-melting metal alloy, cooling channels being cast in at the same time. This can be accomplished, for example, by inserting cooling tubes, helices, or coils beforehand.

In both cases, it is of essential significance to the invention that both the casting compound and the inserts (cooling tube etc.) are brought to temperatures during the filling such that, when the casting compound cools, an expansion gap forms as a result of shrinkage.

The invention is distinguished by simple and economic construction. The cooling tube can be manufactured from any suitable material. The heat transfer is only slightly impaired by the comparatively thin layer of casting compound (even if the latter is made of synthetic resin).

Further developments of the subject invention make possible controlled routing of the cooling liquid in the interior of the cooling tube in the case of tubular ozonisers with supply and removal of the cooling liquid at one end. Analogous effects are produced in the case of tubular ozonisers in which the cooling liquid is fed in at one end and removed at the other.

GENERAL DISCUSSION

Recent investigations have shown that the power density in tubular ozonisers can be increased to 25 kW/m$^2$ if the ozoniser has double-sided cooling and the discharge gap is made very narrow. This imposes high requirements on the mechanical tolerances. Thus, reference is expressly made to the importance of the tolerances in connection with double cooling in German Offenlegungsschrift No. 2,333,311.

Conventional ozonisers for industrial applications have a structure as is shown, for example, in German Offenlegungsschrift No. 3,220,018, especially in FIG. 9. A multiplicity of ozoniser tubes are accommodated in a common shell. Each ozoniser tube consists of an outer metal tube in which an internally metallised glass tube is concentrically disposed with the formation of an annular gap.

The metal tubes are welded into a kind of tube base at both ends of the casing. Cooling liquid is fed into the space bounded by the shell casing and the two tube bases. In this way, the metal tubes (at earth potential) which form the outer electrodes are cooled.

In addition to narrowly toleranced glass tubes, this type of construction also requires narrowly toleranced metal tubes in order to keep the width of the gap as constant as possible everywhere. In addition, extensive measures have to be taken to ensure that the metal tubes do not distort on mounting in the tube bases. A further inadequacy of this design is to be seen in the fact that various casing sizes have to be made available for different production rates, and modularisation is limited only to the number of shells and their size.

If the tubular outer electrode is replaced by a metal block which is provided with a through hole and which has cooling channels, the advantage is obtained that the outer electrodes are now largely torsionally rigid and self-supporting. They can be fitted without mechanical and thermal stresses. The ozone generator can be constructed using a modular construction method. According to the degree of modularisation, one or more ozoniser tubes can be incorporated in a single block module without impairing the cooling. The block modules are preferably manufactured from cast aluminium. In particular, the technology of continuously casting aluminium is advanced to such an extent that the required mechanical tolerances can easily be maintained. In addition, aluminium offers the advantages that, on the one hand, the holes (outer electrodes) in which the discharges take place can be protected against discharge attack by anodic oxidation and, on the other hand, aluminium is an excellent conductor of heat. In this way, the discharge dissipation heat can be removed without a large temperature gradient to the cooling points. The cooling of the modules can take place in various ways (directly or indirectly):
- directly through cooling holes along the discharge gap or transverse to it,
- indirectly through external cooling tubes between adjacent modules.

BRIEF DESCRIPTION OF THE DRAWINGS

Further advantages of the invention, as well as expedient developments of the subject of the invention, are explained below with reference to the exemplary embodiments shown in the drawing.

DETAILED DESCRIPTION OF THE PRESENTLY PREFERRED EMBODIMENTS

Figure 1:
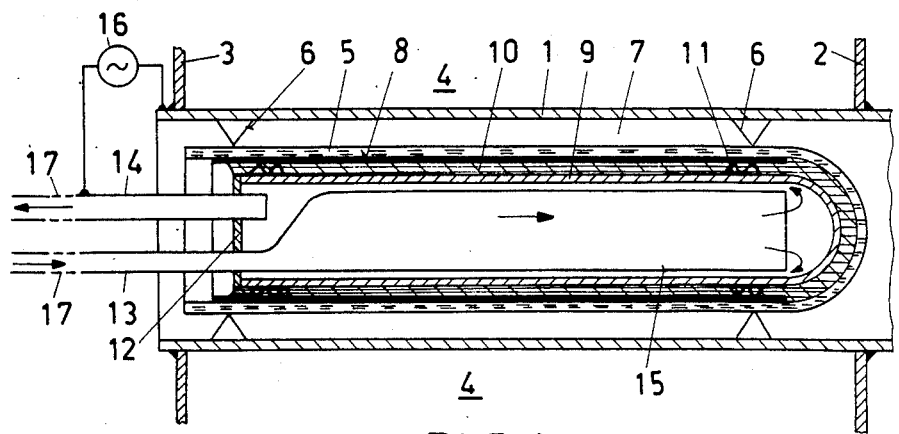
FIG. 1 is a diagrammatic representation of an internally cooled tubular ozoniser with supply and removal of the cooling agent at one end.

In FIG. 1, a tube 1 of high-grade steel is welded into two tube bases 2, 3. The tube bases 2 and 3 as well as the tube 1, together with the ozoniser casing (not shown), form the boundaries of a first cooling chamber 4 through which a cooling liquid is fed for the purpose of external cooling.

Into the tube 1 there is inserted a glass tube 5. The glass tube 5 is closed at one end and is fixed in the interior of the tube 1 by means of spacers 6 with the formation of an annular gap 7. The internal wall of the glass tube 5 is provided with a metal layer 8 which extends virtually from the open end to the closed end of the glass tube 5. The tube 1 forms the outer or earth electrode of the tubular ozoniser, the metal layer 8 forms the inner electrode of the tubular ozoniser, and the annular gap 7 is the discharge chamber.

Into the interior of the glass tube 5 and separated from it on all sides by a gap of preferably 0.5 mm there is inserted a cooling tube 9 of high-grade steel closed at one end. The gap between the glass tube 5 and the cooling tube 9 is filled up with a heat-resistant synthetic resin compound 10 which conducts heat well. Only an expansion gap (not shown) is left between the the resin compound 10 and the inner wall of the glass tube 5. Preferably an epoxy casting compound is used for this purpose such as those developed for the sealing of electric circuits. Such compounds are distinguished by high temperature resistance (up to 400° C.) and good thermal conductivity (approx. 0.9 W/m °C.). The metal layer 8 in the glass tube 5 is electrically connected to the cooling tube 9 by contact springs 11 of beryllium bronze which are embedded in the synthetic resin 10 and at the same time provide the spacing between the cooling tube 9 and the glass tube 5 before the introduction of the synthetic resin compound.

The filling of the gap with the synthetic resin compound 10 is preferably carried out as follows: the inner wall of the glass tube 5 is provided with a release agent commonly used in plastics technology (e.g., based on Teflon) in order to prevent adhesion of the synthetic resin compound 10. With the glass tube 5 placed vertically, a suitable quantity of synthetic resin compound 10 is poured into it, and the cooling tube 9 is then pushed in. The cooling tube 9 displaces the synthetic resin compound 10 which penetrates into the gap between the outside of the cooling tube 9 and the inside of the metal layer 8 and at first fills it up completely. After the synthetic resin compound 10 and the cooling tube 9 has cooled, an expansion gap is left between the synthetic resin compound 10 and the inner wall of the glass tube 5 as a consequence of the shrinking due to heat and to the properties of the resin. Regardless of the tolerances of the glass tube 5 and the cooling tube 9, this expansion gap is virtually equally large over the entire diameter and the entire length of the glass tube 5 (typically a few 10 $\mu$m). The inner heat sink produced in this way can now expand freely on heating up without transferring any forces to the glass tube 5 as a result. It has been shown that a gap filled up in this way causes a temperature difference of only approx. 5° C. for a tube loading of 2 kw. The electrical coupling of the cooling tube 9 to the metal layer 8 (inner electrode) via the contact springs 11 releases the load on the resin layer in such a manner that it has no effect dielectrically. No harmful discharges are formed even at fault points (such as bubbles) in the synthetic resin compound 10.

The cooling tube 9 is closed at the left-hand end by a lid 12 through which two pipelines 13, 14 are fed. One pipeline 13 extends to a point close to the closed end of the cooling tube 9. The other pipeline 14 opens into the cooling tube 9 immediately underneath the lid 12. To intensify the cooling in the wall region of the cooling tube 9, the pipeline 13 is widened in the cooling tube interior in such a manner that a gap 15 only a few millimeters wide is left between the pipeline 13 and the wall of the cooling tube 9. The connection of a source of alternating voltage 16 for operating the ozoniser is made on the one hand to the tube 1 (outer electrode), which is normally at earth potential, and on the other hand to one of the two pipelines 13 or 14 which are in galvanic contact with the metal layer 8 (inner electrode) via the lid 12 or the cooling tube 9 and the contact springs 11. For potential isolation between the cooling tube 9 or the pipelines 13, 14, isolating gaps 17 are connected in the cooling system (not shown in further detail) as part of the two pipelines 13, 14.

The proposed internal cooling reduces large temperature stresses between the dielectric and the cooling tube 9 since, in contrast to single-sided cooling, the glass is not subjected to any high excess temperatures. Temperature stresses are taken up by the expansion gap. As extensive investigations have shown, the expansion gap between the synthetic resin compound 10 and the glass tube 5 is not critical from a thermal point of view, since the width of the gap varies in the range of a few hundredths of a millimeter.

In the exemplary embodiment according to FIG. 1, inflow and drainage of the cooling medium takes place at one and the same end of the ozoniser. It is of course within the scope of the invention to achieve the proposed internal cooling also in the case of other types of ozoniser such as illustrated by way of example in FIG. 2.

Figure 2:
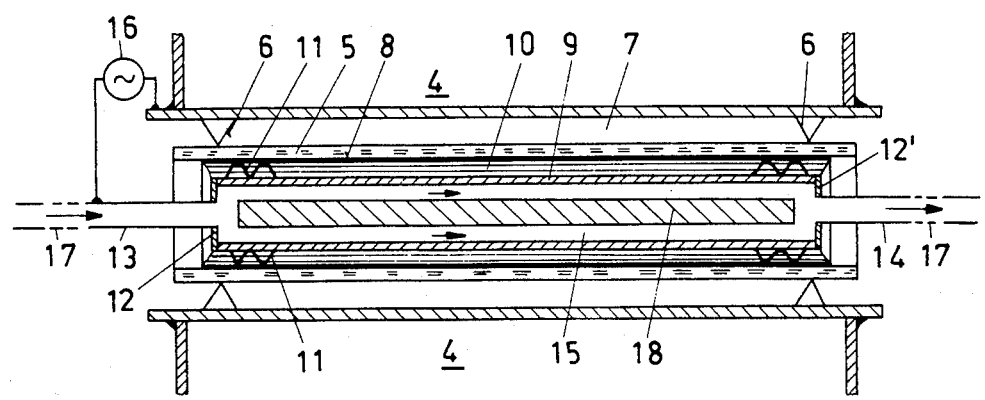
FIG. 2 is a diagrammatic representation of an internally cooled tubular ozoniser with unidirectional flow.

In the embodiment illustrated in FIG. 2, the glass tube 5 is open at both ends. The cooling tube 9 is closed at both ends with a lid 12, 12' through which the pipelines 13 or 14, respectively, are passed. In the interior of the cooling tube 9 there is disposed a displacement body 18 which leaves an annular gap 15 several millimeters wide between itself and the inner wall of the cooling tube 9 and serves to route the cooling agent in a controlled manner along the wall of the cooling tube 9. In other respects the remaining construction of the ozoniser corresponds to that shown in FIG. 1.

Figure 3:
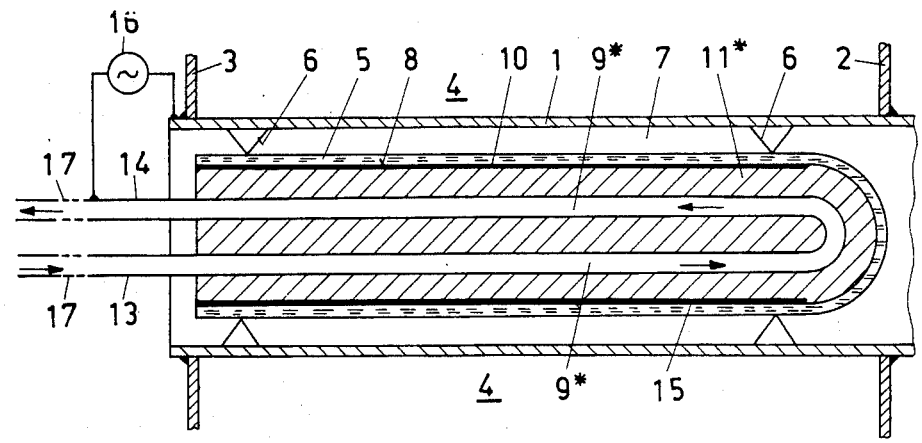
FIG. 3 is a diagrammatic representation of a modification of FIG. 1 with a heat sink bent in the form of a hairpin.

In both the embodiments described, a metallic casting compound of a low-melting alloy (e.g., Wood's alloy), can also be used instead of the synthetic resin compound. Because of the higher thermal conductivity compared with a synthetic resin compound, the gap between the cooling tube 9 and the inner wall of the glass tube 5 can be larger. In the variant according to FIG. 1, in which the cooling agent is fed in and removed at the same end of the glass tube, a cooling tube 9* bent into the form of a hairpin can be embedded in the metallic casting compound 11*, as is illustrated, for example, in FIG. 3. In this case it is possible to do without a special coupling of the cooling tube 9* to the metal layer 8 since the heat sink (casting compound 11* and cooling tube 9*) rests on the inner electrode at least locally (in the ideal case, linearly) and is consequently in galvanic contact with the latter. In this case it is even possible to do without the usual internal metallisation of the glass tube 5, since here the metallic casting compound 11* takes over the function of the inner electrode.

Figure 4:
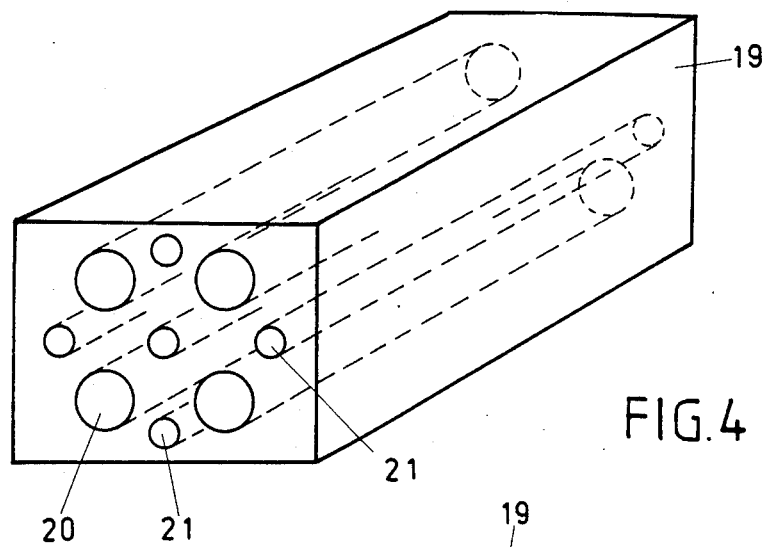
FIG. 4 is a perspective representation of a first block module with cooling channels running parallel to the outer electrodes.

FIG. 4 shows a block module 19 in the form of a rectangular body. The block module 19 is made of continuously drawn aluminium with four first through holes 20 running in the longitudinal direction of the block module 19 and five second through holes 21 running parallel to them. The first through holes 20 form the outer boundary of the discharge gap, the second through holes 21 form the cooling agent holes. The walls of all the through holes are provided with an anodic oxide layer (not shown). In the case of the first through holes 20, this anodic oxide layer protects against attack by the discharge. In the case of the second through holes 21, their inner walls are protected against corrosive attack by the cooling agent (as a rule water) flowing through them.

Figure 5:
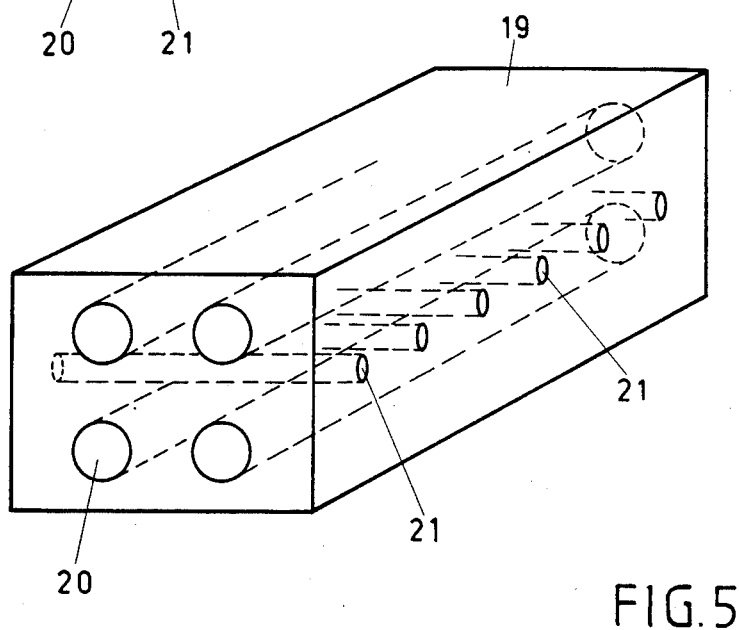
FIG. 5 is a perspective representation of a second block module with cooling channels running transversely to the outer electrodes.

In FIG. 5 the first through holes 20 run in the longitudinal direction of the block module 19; the second through holes 21 are transverse to the first through holes 20 without, however, cutting into them. The individual block modules can be stacked close together on top of each other and/or beside each other and can be trussed together by known means.

Figure 6:
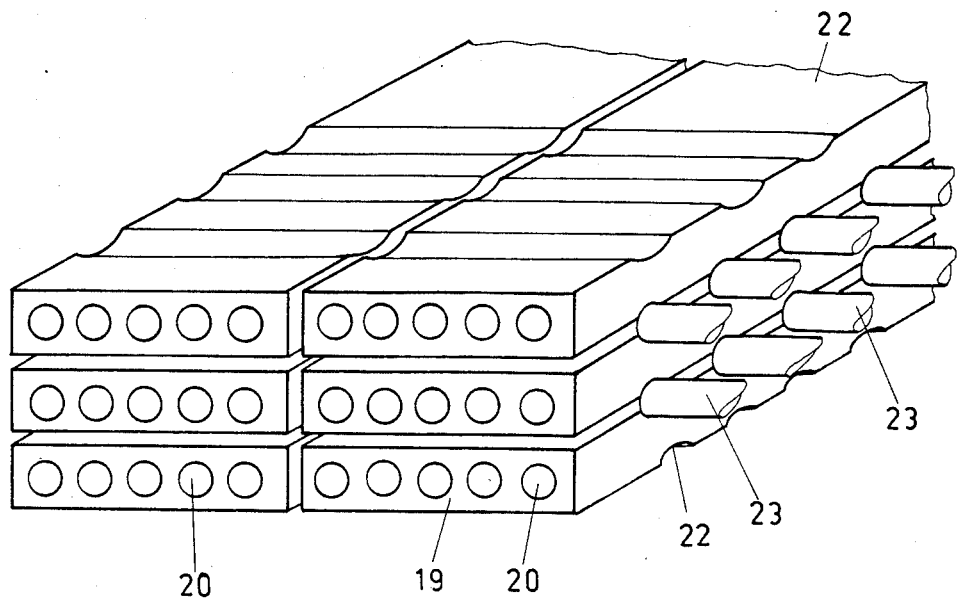
FIG. 6 is a perspective representation showing block modules stacked on top of and next to each other with separate cooling tubes between adjacent modules.

A further embodiment of a block module 19, as is illustrated in FIG. 6, has a layer of first through holes 20 disposed next to each other. The wide faces are provided with grooves 22 having approximately semicircular cross-section which run transversely to the first through holes 20. Between successive layers of the block module 19 there are always inserted external cooling tubes 23 through which a cooling agent can be fed. The cooling tubes 23 fix the mutual position of the block modules 19 in the module longitudinal direction and, as a consequence of the friction existing between the cooling tubes 23 and the block modules 19, also in the transverse direction.

All the embodiments have in common that as many modules as required can be stacked on top of each other in building block fashion.

Figure 7:
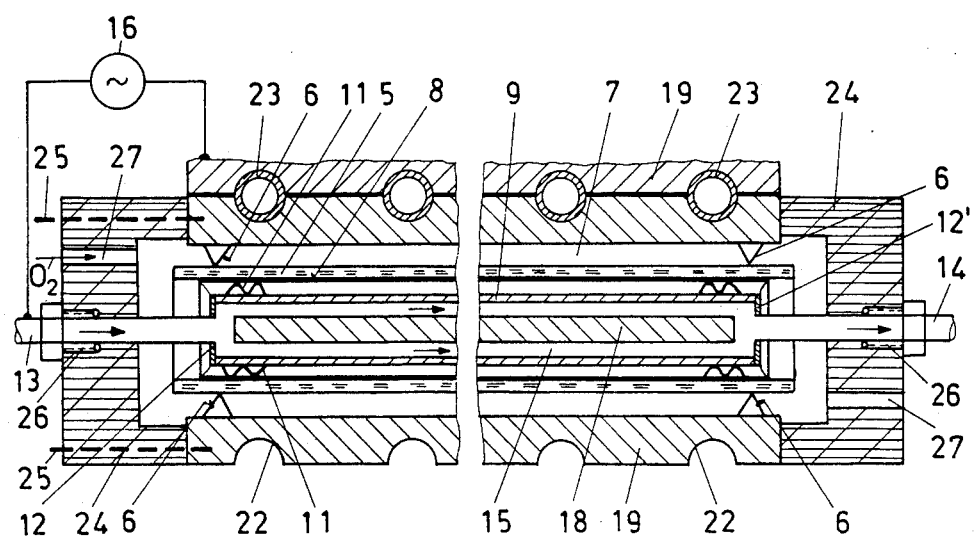
FIG. 7 is a longitudinal section through an ozone generator with block modules as in FIG. 5.

FIG. 7 now shows the manner in which, for example, the block module 19 shown in FIG. 4 is disposed in an ozone generator according to FIG. 2. In the first through hole 20 in the block module 19 a glass tube 5 closed at one end is mounted concentrically by means of spacers 6. The internal wall of the glass tube 5 is provided with a metal layer 8. The annular gap 7 between the first through inner wall of the hole 20 and the outer wall of the glass tube 5 forms the discharge gap of the ozoniser. The inner wall of the first through hole 20 and the metal layer 8 respectively form the outer electrode, at earth potential, and the inner electrode, at high voltage potential, of the ozone generator.

Both end faces of the block module 19 are closed by means of a terminating cap 24 of insulating material (e.g., Teflon), in a gas tight manner by means of screws 25. The pipelines 13, 14 are fed at both ends through the cap 24 and sealed and secured with respect to the latter by means of tube screw connections 26.

The supply of the oxygen or oxygen-containing gas mixture to the annular gap 7 takes place via suitable connection fittings, which are screwed into holes 27 in the cap 24. The gas mixture enriched with ozone is removed in an analogous manner to this at the opposite face of the block module.

It is within the scope of the invention that a tubular ozoniser with single-end supply and removal of the cooling agent for the internal cooling can also be constructed using block modules according to FIG. 4. Naturally, the internal cooling according to the invention can also be used in block modules according to FIGS. 3 and 4.

We claim:
1. A tubular ozoniser comprising:
(a) an outer, electrically conductive tube;
(b) an inner, dielectric tube disposed within but spaced from said outer, electrically conductive tube, the space between the outside of said inner, dielectric tube and the inside of said outer, electrically conductive tube comprising a discharge gap;
(c) a cooling tube disposed within but spaced from said inner, dielectric tube;
(d) a plurality of contact springs disposed between said cooling tube and said inner, dielectric tube, said plurality of contact springs serving to space said cooling tube from said inner, dielectric tube;
(e) a coating of a thermally conductive material formed on the outside of said cooling tube and extending outwardly to within a few 10 $\mu m$ of the inside of said inner, dielectric tube, the space between the outside of said coating of thermally conductive material and the inside of said inner, dielectric tube comprising a thermal expansion gap; and
(f) first means for conducting a cooling fluid through said cooling tube.

2. A tubular ozoniser as recited in claim 1 wherein said outer, electrically conductive tube is made of metal.

3. A tubular ozoniser as recited in claim 1 wherein said inner, dielectric tube is made of glass.

4. A tubular ozoniser as recited in claim 1 and further comprising an electrically conductive layer formed on the inside of said inner, dielectric tube.

5. A tubular ozoniser as recited in claim 4 wherein said electrically conductive layer is made of metal.

6. A tubular ozoniser as recited in claim 4 and further comprising second means for imposing a voltage differential between said outer, electrically conductive tube and said electrically conductive layer.

7. A tubular ozoniser as recited in claim 6 wherein:
(a) said cooling tube and said plurality of contact springs are electrically conductive and
(b) said second means is electrically coupled to said cooling tube, which in turn is electrically coupled to said electrically conductive layer through said cooling tube and said plurality of contact springs.

8. A tubular ozoniser as recited in claim 1 wherein said first means comprise a pipe line disposed within but spaced from said cooling tube.

9. A tubular ozoniser as recited in claim 1 wherein:
(a) said cooling tube has a first end that is open and a second end that is closed and
(b) said first means comprise an inlet pipe line and an outlet pipe line, both of which enter said cooling tube through its first end.

10. A tubular ozoniser as recited in claim 9 and further comprising a displacement body disposed within said cooling tube but spaced therefrom.

11. A tubular ozoniser as recited in claim 1 wherein:
(a) said cooling tube has two ends, both of which are open, and
(b) said first means comprise an inlet pipe line that enters said cooling tube through one of its ends and an outlet pipeline that enters said cooling tube through its other end.

12. A tubular ozoniser as recited in claim 1 wherein said thermally conductive material is a heat-resistant synthetic resin.

13. A tubular ozoniser as recited in claim 1 wherein said thermally conductive material is a metallic casting compound.

14. A tubular ozoniser as recited in claim 1 wherein the space between the outside of said cooling tube and the inside of said inner, dielectric tube is between 1 and 1.5 mm in width.

15. A tubular ozoniser as recited in claim 1 wherein said outer, electrically conductive tube, said inner, dielectric tube, and said cooling tube are all circular in cross section and are all concentric.

16. A tubular ozoniser as recited in claim 1 wherein said cooling tube has at least one open end and further comprising a lid sealing said cooling tube at said at least one open end.

17. A tubular ozoniser as recited in claim 16 wherein said cooling tube has two open ends and further comprising a lid sealing said cooling tube at each of said two open ends.

18. A tubular ozoniser as recited in claim 1 wherein said outer, electrically conductive tube is a first through hole in an electrically conductive block.

19. A tubular ozoniser as recited in claim 18 and further comprising:
(a) a second through hole in said electrically conductive block and
(b) third means for conducting a cooling fluid through said second through hole.

20. A tubular ozoniser as recited in claim 19 wherein said second through hole comprises a groove formed in the outer surface of said electrically conductive block.

21. A tubular ozoniser as recited in claim 18 and further comprising a terminating cap mounted on said electrically conductive block, said first means extending through said terminating cap.

* * * * *